3,392,213
OLEFIN POLYMERIZATION PROCESS
Martin Norbert Berger, Whitefield, England, assignor to Shell Oil Company, New York, N.Y., a corporation of Delaware
No Drawing. Filed Nov. 18, 1964, Ser. No. 412,250
Claims priority, application Great Britain, Nov. 21, 1963, 45,997/63
5 Claims. (Cl. 260—878)

ABSTRACT OF THE DISCLOSURE

In the polymerization of ethylene by means of Ziegler catalysts, a homogeneous total polymer consisting of fractions of different molecular weight is obtained by carrying out the polymerization in at least two reactors operating in series, polymer having an intrinsic viscosity between 0.4 and 2.0 being produced in one stage and polymer having an intrinsic viscosity between 3 and 20 in another stage, the production in the two stages being controlled to produce a total polymer product having a flow parameter between 1.4 and 2.5.

---

The present invention relates to the polymerization of olefin monomers by the Ziegler low-pressure method, the term polymerization including copolymerization; and to the polyolefins, e.g., polyethylene or copolymers of ethylene, produced thereby. Such polyolefins can be described as "Ziegler polyolefins."

The Ziegler low-pressure method by which olefins such as ethylene and higher alpha-monoolefins can be polymerized or copolymerized with the aid of a Ziegler catalyst, and the general conditions required for such polymerization are now well-known. For example Professor Ziegler's U.K. patent specifications Nos. 799,392; 799,823; and 801,031 describe forms of Ziegler catalyst and the conditions under which ethylene polymerization using such catalysts can be effected. U.K. patent specification No. 867,566 also describes Ziegler catalysts and the manner in which they can be formed. The present invention is particularly, though not exclusively, concerned with polymerization with the aid of a particular kind of Ziegler catalyst which comprises, in admixture, an organo-metallic component, e.g., aluminum diethyl chloride or an aluminum alkoxide, and a compound of a transition metal in which compound the metal, e.g., titanium, is present in a valency state which is next below the normal maximum valency state of said metal, e.g., titanium in the trivalent state as compared with the normal maximum tetravalent state. This kind of catalyst has been referred to in the art as a Ziegler/Natta catalyst and this term is used herein to denote such a catalyst. The term "olefin monomer" is used herein to denote any olefin or mixture of olefins which can be polymerized or copolymerized with the aid of a Ziegler (including Ziegler/Natta) catalyst.

It has now been found that desirable Ziegler polyolefins can be obtained by effecting polymerization of olefin monomers in such a manner that the catalyst used in the polymerization catalyzes the sequential formation of a plurality of polymers, each of different average molecular weight (as indicated by its intrinsic viscosity) which together constitute the total polymer product of the process. By using the same catalyst to catalyze the formation of said polarity of polymers, a sequential growth of polymer chains of different chain length (depending on the polymerization conditions subsisting during the formation thereof) appears to take place in close proximity on the catalyst particles. This results in a degree of homogeneity in the total polymer product which, surprisingly, cannot be obtained by the physical admixture of individual reaction slurries (i.e., polymer suspensions in liquid media resulting from Ziegler polymerizations) obtained from a plurality of separate polymerizations each carried out under different conditions with the aid of its own Ziegler catalyst to produce polymers of different intrinsic viscosities, essentially like those produced in the several stages of the process of this invention. It has been found that the ultimate polymer product obtained on working-up admixed, separately prepared reaction slurries exhibits unacceptable macro-inhomogeneity.

According to the present invention there is provided a polymerization process which comprises polymerizing olefin monomer, as herein defined, by contact with a Ziegler catalyst in such a manner that said catalyst catalyzes the sequential formation, in any order, of a plurality of olefin polymers, said process comprising polymerization conditions which will form a polymer having an intrinsic viscosity between 0.4 and 2 and also polymerization conditions which will form a polymer having an intrinsic viscosity between 3 and 20, and the total olefin polymer product of said process comprising said plurality of polymers and having a flow parameter (as herein defined) within the range 1.4 to 2.5.

The intrinsic viscosity (I.V.) of a polymer is an indication of the weight average molecular weight of the polymer. It can be determined by measuring the viscosity of a dilute solution of the polymer and calculation in the manner well known to those skilled in the art. In the present specification the intrinsic viscosity values were obtained using a 0.1% by weight solution of a polymer in decalin at 120° C.

A particular application of the present invention lies in the production of a polyolefin product having particular shear sensitivity properties. A measure of shear sensitivity is the "flow parameter," which is defined herein by the value $n$ in the expression:

$$\text{Shear rate} = k(\text{shear stress})^n \tag{1}$$

in which $k$ is a constant. In this specification the flow parameters referred to are "melt indexer flow parameters," obtained using an ASTM melt indexer. In obtaining flow parameters in this way the melt index of the polymer is measured at a specified temperature. Any convenient temperature can be used; the flow parameter figures herein refer to measurement at 190° C. The melt index (MI) is measured in grams/10 minutes, using an ASTM melt indexer under applied weights of 21.6 kilograms ($MI_A$) and 2.16 kilograms ($MI_B$). The flow parameter is calculated from the relationship:

$$n = \log_{10} \frac{MI_A}{MI_B} \tag{2}$$

It has been found that for some applications of Ziegler polyolefins particular shear sensitivity properties are required in a polyolefin in order that it be suitable for such use. For example in fast cycle bottle blowing, which is an extrusion technique placing considerable demands on the polymers used, a critical shear sensitivity is required to avoid melt fracture during bottle manufacture and to ensure that the resulting bottles are fully acceptable to the trade in regard to general properties such as wall thickness and exterior surface appearance. The particular properties required are to be found in polymers of particular molecular weight distribution, expressed in terms of a melt indexer flow parameter range of 1.4 to 2.5. The flow parameter of the polyolefin should lie within this range if it is to be suitable for use in the manufacture of hollow articles by a fast-cycle extrusion process, and preferably, in the case of polymers intended primarily for "bottle blowing," in the flow parameter range of 1.7 to 2.2. The term "fast-cycle" is to some extent a relative one; it is sufficient to note that economic considerations require the production of hollow articles to be as rapid as possible and that bottle blowing machinery is now becoming available which permits a high rate of production (fast-cycle production) to be achieved, providing a polymer of suitable shear sensitivity properties is used. When manufacturing such a polymer it is, of course, necessary to ensure that the polymer properties in general are suitably balanced in addition to its shear sensitivity properties being satisfactory.

In carrying out the present invention it is essential that the sequential formation of a plurality of individual polymers be catalyzed by the same catalyst throughout; this can be achieved by effecting polymerization in a single reactor operated in such a way that polymerization conditions are changed to the required extent at least once during polymerization, but it is preferably carried out in a plurality of reactors connected in series, each reactor being operated under conditions appropriate to the particular polymer it is required to produce therein. Reaction mixture comprising polymer and "live" catalyst is passed through the reactors in series. The reaction medium removed from the last reactor comprises the total polymerization product. Operation with a plurality of reactors, each providing a separate polymerization zone, is necessary when polymerization is to be carried out continuously, though such an arrangement can also be used for batchwise polymerization. Although more than two reactors can be used in series, the advantages of the present invention can usually be achieved using two reactors in series and for ease of description the present invention will be described mainly in connection therewith.

According to one aspect of the present invention an olefin polymerization process comprises supplying olefin monomer to a first polymerization zone comprising a dispersion of a Ziegler/Natta catalyst in an inert liquid diluent and effecting polymerization of said monomer therein under steady state conditions, continuously withdrawing from said zone a reaction mixture comprising polymer formed in said zone, catalyst and liquid diluent, continuously supplying to a second polymerization zone reaction mixture withdrawn from said first zone, supplying additional olefin monomer to said second zone, effecting polymerization of said olefin monomer in said second zone under steady state conditions different from the polymerization conditions maintained in said first zone, and continuously withdrawing reaction medium from said second zone for work-up to isolate the total polymer product of said process. The polymerization conditions in one of said zones are controlled, in dependence upon the rate of formation of polymer in the other of said zones and in dependence upon the intrinsic viscosity of said last-mentioned polymer, in such a manner that the flow parameter of said total polymer product is between 1.4 and 2.5. Preferably polymerization in said first zone or in said second zone or in both said zones is effected in the presence of hydrogen supplied to said zone or zones either as a separate feed or in admixture with olefin monomer. In the production of homopolymers the same olefin monomer will be supplied to each of said zones; in the production of a copolymer the same or a different olefin monomer can be supplied to said zones.

Usually the whole of the reaction medium withdrawn from said first zone will be supplied to said second zone, but in circumstances in which the olefin polymer formed in said first zone is a useful polymer in itself it is of course possible to supply to the second zone only part of the reaction medium withdrawn from said first zone and to work up the remainder thereof for isolation of the polymer product for use as such.

In carrying out the present invention in the manner just defined the same portion of catalyst is used to catalyze the formation of each of said plurality of polymers and the polymerization conditions under which each polymer is produced are controlled in any known or suitable manner so as to produce a plurality of polymers each having a suitable average molecular weight or I.V. The residence times in each of said zones are controlled such that the amount of polymer produced in each zone is that which is required to keep the flow parameter of the total polymer product of the process within the stated limits. Preferably polymerization is carried out in such a manner that the plurality of polymers formed comprises two polymers having intrinsic viscosities between 0.4 and 2 and 3 and 20, respectively. When polymerization is carried out in two zones in the manner just defined the polymers formed in said first and second zones conveniently have intrinsic viscosities between 0.4 and 2 and 3 and 20, respectively, although it is equally possible to form the higher molecular weight polymer in the first zone.

A number of methods for controlling polymerization so as to produce at will a polymer of required intrinsic viscosity are known to the art. One such method comprises selection of the appropriate polymerization temperature for a given system. Another comprises the use of a so-called molecular weight modifier, such as hydrogen. A combination of such means may be employed. In the case of Ziegler polymerization with the aid of catalysts comprising the admixture of an organo-metallic component and a transition metal compound in which the metal is in its normal maximum valency state, the usual means of controlling molecular weight, i.e., by varying the ratio of said organo-metallic component to said transition metal compound, should be avoided in carrying out the present invention since the result of such measures is that different catalysts would be present during the polymerization. For the same reason, molecular weight modifiers which completely change the nature of the catalyst are unsuitable. In this respect it can be said that where, as will normally be the case, the catalyst is used in a particulate form, then molecular weight modifiers or molecular weight modifying conditions can be used or molecular weight modifying measures can be taken which do not substantially increase the number of "fresh" active catalyst particles in second or subsequent stages of polymerization as compared with the number of active particles present in the preceding stage in order that the essential feature of the sequential growth of polymer molecules of different chain length on the same catalyst particles can be achieved. The word "fresh" is used in this sense to mean a catalyst particle which does not have attached to it a polymer chain or chains produced in a previous stage of polymerization. It is preferred to use hydrogen when it is desired to modify the molecular weight of the polymer produced during any individual polymerization period in accordance with the present invention. When operating in this way at at least one, and when necessary each, of said plurality of polymers is formed from said olefin monomer by polymerizing said monomer in the presence of the appropriate amount of hydrogen. The general conditions under which hydrogen can be used to control molecular weight in Ziegler polymerization are known to those skilled in the art. If the presence of hydrogen is not required in a subsequent polymerization zone, any dissolved hydrogen present in the reaction mixture from the preceding polymerization zone can be removed, e.g., by inert gas purging prior to entering the subsequent zone, though in general the low solubility of hydrogen in the kind of reaction media used in Ziegler polymerization makes it unnecessary to remove hydrogen between zones unless it is desired to operate the succeeding zone in the complete absence of hydrogen.

The present invention is particularly applicable to the production of modified polyethylene suitable for fast-cycle blow molding, by polymerization of ethylene either alone or together with one or more other olefinic monomers copolymerizable therewith, e.g., up to 10% by weight, based on ethylene, of propylene or butene-1. The present invention is, however, not limited to ethylene polymerization and can be applied, for example, to the production of polypropylene of desirable characteristics and to the production of other polyolefins. Olefin monomer herein refers to the feed mixture consisting of ethylene alone, propylene alone, mixtures of ethylene with up to 10% by weight of propylene or 1-butene, propylene with a minor proportion of ethylene or 1-butene, and similar feeds of alpha-monoolefin hydrocarbons of 2 to 8 carbon atoms which provide crystallizable Ziegler polymers.

It will be understood that when preparing Ziegler copolymers different olefin monomers can be supplied to each polymerization zone. For example, when preparing ethylene copolymers the feed to the first zone can comprise ethylene, while the feed to the second zone can comprise ethylene together with the required co-monomer, e.g., propylene.

It will be apparent to those in the art that determination of the required polymerization conditions in each of, say, two polymerization zones on the basis of polymer product property requirements can be carried out readily with the aid of appropriate laboratory control or by providing suitable monitoring control of the polymerization conditions in the second polymerization zone, which will provide for the control of said conditions in accordance with the nature of the polymer contained in the reaction mixture withdrawn from the first zone. For example, the following is a convenient way of effecting in a two-stage process the necessary control of (1) the characteristics of the two individual polymers which together constitute the total polymer product of the polymerization process and (2) the relative proportions of these individual polymers. A suitable intrinsic viscosity value ($IV_A$) for one of said polymers is chosen, which is either between 0.4 and 2 or between 3 and 20. Polymerization conditions in one reactor are maintained to result in the production therein of an amount $a$ of a polymer (A) of intrinsic viscosity $IV_A$. The required amount ($b$) of polymer (B) of different intrinsic viscosity ($IV_B$) from the other of the intrinsic viscosity ranges 0.4 to 2 and 3 to 20 (depending on the chosen value of $IV_A$) which should be produced in the other reactor in order to give a total polymer product (AB) of required intrinsic viscosity ($IV_{AB}$) is then calculated from the equation:

$$IV_{AB} = aIV_A + bIV_B \quad (3)$$

The total polymer product is, of course, the sum of $a$ and $b$ and for any particular olefin polymer or copolymer, e.g., a polyethylene of density 0.96, it is possible to make use of data compiled by calculation and experiment to determine the conditions which should be employed in each reactor in order to produce a total polymer product of required flow parameter within the range 1.4 to 2.5. The polymerization conditions employed in one of a set of two reactors would, of course, depend on those selected for the other reactor; in practice any small difference between the actual polymerization conditions required and the predicted conditions can be eliminated in a manufacturing operation by appropriate direct control of the polymerization conditions in one or both reactors by making such changes as are necessary from time to time to ensure the continuous production of an ultimate polymer product of the required flow parameter. The process of the present invention therefore provides a ready means of producing olefin polymer products of desired flow parameter characteristics.

In order to illustrate the principles embodied in the process of the present invention reference may be made to the following theoretical considerations. An object of this invention is to enable the manufacture of Ziegler polyolefins having a molecular weight distribution such that their flow parameters lie within the above-defined range. This is achieved by effecting polymerization under conditions which will produce a polyolefin product of broader molecular weight distribution than would normally be produced in a Ziegler polymerization, this broader distribution resulting from the sequential formation of individual polyolefins of different intrinsic viscosities (as previously defined) under conditions resulting in an end product comprising the combination of said individual polyolefins, which end product is of acceptable homogeneity.

It has been found that the width of molecular weight distribution, as defined by the so-called Q value, of a polyolefin is a function of its intrinsic viscosity. It has also been found that for a blend of two polyolefins A and B, e.g., two polyethylenes or two polypropylenes, the relationship between the width of the molecular weight distribution ($Q_{AB}$) and intrinsic viscosity takes the form:

$$Q_{AB} = a\left[a + b\frac{IV_B}{IV_A} 1/X\right] Q_A + b\left[b + a\frac{IV_A}{IV_B} 1/X\right] Q_B \quad (4)$$

in which $a$ and $b$ are the weight fractions of polyolefins A and B of intrinsic viscosities $IV_A$ and $IV_B$ and molecular weight distributions $Q_A$ and $Q_B$ respectively; and in which X is the exponent in the form of equation relating intrinsic viscosity and weight average molecular weight proposed by Duch and Kuchler—see e.g. "Polyethylene" by R. A. V. Raff and J. B. Allison (Interscience Publishers, Inc., 1956) page 194.

For a given kind of polyolefin a relationship can be established experimentally between molecular weight distribution and flow parameter, the latter being the melt indexer flow parameter determined in the manner described above. Those skilled in the art are in a position to predict, from experience and the necessary experimental investigation and verification, the necessary flow parameter requirement for a polyolefin intended for a particular end use in the plastics molding industry. It follows therefore that the skilled man can predict the value of $Q_{AB}$ in the formula quoted above and, knowing X; $Q_A$ and $Q_B$ as functions of $IV_A$ and $IV_B$, respectively; $IV_{AB}$ as a function of $Q_{AB}$; and $IV_{AB}$ as the sum of $aIV_A$ and $bIV_B$, he then has a choice of the conditions he can employ in carrying out the process of the present invention in two stages. For example, starting with a predicted value of $Q_{AB}$ and using the relationships just specified provides a numerical value for an expression involving for example $a$ or $b$ and the two intrinsic viscosities $IV_A$ and $IV_B$. As indicated above the latter are chosen so that one I.V. falls within the range 0.4 to 2.0 and the other I.V. falls within the range 3 to 20, the choice in each case being made usually on the basis of convenience of manufacture and the need, on manufacturing scale, to avoid conditions which are unworkable in practice as for example conditions which would require the production of an impractically small quantity of one of the component polymers.

It will be appreciated from the foregoing illustrative considerations that the carrying out of the present invention is in principle a straightforward matter to those skilled in the art and that within the limits imposed by the definition of the present invention considerable latitude exists in regard to the specific conditions which can be employed to obtain a desired polymer product having a flow parameter within the range 0.4 to 2.5, such specific conditions normally being selected, within the limits of variation available, to suit the characteristics of the polymerization plant employed and the general operating conditions under which it is desired to work.

In carrying out the present invention with the aid of two reactors in series, each operated in a continuous manner under steady state conditions, it is often convenient to produce polymer (A) as the polymer of highest intrinsic viscosity in the second reactor by effecting polymerization therein in the substantial absence of hydrogen or in the presence of only the small amount of hydrogen which is carried over in the reaction mixture withdrawn from the first reactor. From previously determined data regarding operating conditions in the Ziegler process in the plant employed it is possible to choose polymerization conditions which will produce a polymer (A) of selected intrinsic viscosity ($IV_A$) within the range 3 to 20 in the second reactor; the amount ($a$) of polymer (A) produced therein per unit of time can be fixed by choosing an appropriate residence time in the second reactor, again from previously determined data. The first reactor is then operated under conditions which will produce a polymer (B) of lower intrinsic viscosity within the range 0.4 to 2; such conditions advantageously include the use of an appropriate amount of hydrogen to give a polymer (B) of intrinsic viscosity ($IV_B$) such that for an amount ($b$) of polymer (B) formed in the same unit of time, the intrinsic viscosity ($IV_{AB}$) of the total polymer product (in amount $a$ plus $b$ per unit time) is such that it meets the flow parameter requirements of the polyolefin it is desired to produce in the polymerization process as a whole. The present invention therefore provides a means of producing a polyolefin of a required molecular weight distribution by the successive production of component polymers, each of which contributes on a statistical basis to the molecular weight distribution of the ultimate polymer product. This is made possible by the fact that polymerization in accordance with the present invention yields a truly homogeneous product such as cannot be achieved by the physical processes of admixture at present available for use on a manufacturing scale.

Although for convenience it has often been found advantageous to produce the higher molecular weight polymer in the second polymerization reactor, this is by no means essential. When preparing copolymers it is also convenient to supply the co-monomer present in minor amount in the polyolefin product to the second reactor to avoid having to purge unwanted co-monomer from the reaction mixture withdrawn from the first reactor. For example propylene is appreciably soluble under reaction conditions in the kind of hydrocarbon diluent employed in Ziegler polymerization and, if not removed in this way, would be carried over to the second reactor. Hydrogen, advantageously used to control molecular weight in the first reactor, has such a low solubility, however, that the very small carry-over to the second reactor can be tolerated.

Suitable Ziegler catalysts for use in this invention are formed from a transition metal compound and a metal-organic compound capable of acting as a reducing agent. A large number of such polymerization catalysts based on transition metal compounds are known. A summary of the state of the art in 1959 is found in "Linear and Stereoregular Addition Polymers" by Gaylord et al., Interscience Publishers, Inc., New York. Many additional catalyst systems have been disclosed since then in patents and technical journals. In practice, only a very limited number of catalyst systems have achieved commercial success for production of polyethylene, of olefin copolymers and of highly stereoregular polypropylene. The preferred, and most highly stereoregulating catalyst representative of the Ziegler/Natta catalysts, are based on a chloride of titanium in a valence state less than four, used with an luminum trialkyl or aluminum alkyl halide, preferably an aluminum dialkyl monohalide.

One essential component of the catalyst compositions is a halide or alkoxyhalide of a transition metal selected from Groups 4b, 5b, 6b or 8, and preferably from Group 4 or 5, of the Periodic Table of the Elements, as illustrated on pages 448 and 449, Handbook of Chemistry and Physics, The Chemical Rubber Publishing Corp., 44th Edition, 1962. In the active catalyst the transition metal is at a valence below its maximum. Among the halogens the order of preference runs from chlorides to bromides to iodides to fluorides.

Titanium trichloride is particularly preferred. With a highly effective aluminum alkyl, this leads to the most effective catalysts. An active form of titanium trichloride is prepared by reducing titanium tetrachloride by reaction with an aluminum trialkyl, as described, for example, in U.S. 2,971,925 to Winkler et al. Activated forms of alpha and gamma titanium trichloride are sometimes referred to as delta titanium trichloride. The gamma form is often preferred; the delta form, as well as the beta form are also suitable. These active forms of titanium trichloride generally may be considered as molecular alloys of $TiCl_3$ and $AlCl_3$ of varying compositions. Both the $\beta$-$TiCl_3$ and $\gamma$-$TiCl_3$ can be produced by reacting 1 mol of $TiCl_4$ with ⅓ mol aluminum triethyl. Brown $\beta$-$TiCl_3$ results when the reaction is carried out at relatively low temperature, e.g., 25° C.; purple $\gamma$-$TiCl_3$ is produced at a higher temperature, e.g., 160° C. Other catalytically active forms of $TiCl_3$ are commercially produced by reduction of $TiCl_4$ by means of aluminum metal, or with hydrogen, followed by an activating treatment.

Other suitable titanium compounds include butoxy titanium dichloride and ethoxy titanium dichloride.

Another preferred catalyst comprises the active form of vanadium trichloride.

Similar compounds of zirconium and other transition metals can be used, such as their trichlorides, tribromides, and alkoxy dichlorides.

The reducing component of the catalyst is an organometallic compound of magnesium, zinc, cadmium, aluminum, gallium or indium, having a metal-to-carbon bond. Aluminum compounds are generally preferred.

Suitable aluminum compounds are those having the formula RR'AlX wherein R and R' each is selected from the group consisting of hydrogen and hydrocarbon and X is selected from the group consisting of hydrocarbon, hydrogen, halogen, alkoxy, aryloxy, the residue of a secondary amine, amide, mercaptan, thiophenol, carboxylic acid and sulfonic acid. Suitable cadmium and zinc compounds are those of the formula RR'Cd or RR'Zn in which each R is a saturated hydrocarbon group of from 1 to 10 carbon atoms, e.g., an alkyl, cycloalkyl, aryl or alkaryl group. Usually R and R' are identical, but they may be different if desired. Zinc or cadmium diethyl and di-n-propyl are particularly preferred. R and R' may also be isopropyl, isobutyl, isoamyl, phenyl, tolyl, and the like.

Preferred for practical purposes are, among the aluminum alkyl compounds, trialkyls and dialkyl monohalides wherein the alkyl groups have from one to ten carbon atoms. Also useful are zinc dialkyls having alkyl groups of from one to ten carbon atoms, and mixtures thereof with aluminum alkyls. Cadmium dialkyls are also of some practical interest. The preferred alkyl group in each type is the ethyl group, but compounds having n-propyl, isopropyl, n-butyl, isobutyl, n-octyl or 2-ethylhexyl groups, etc., may be employed. To produce catalysts which are highly stereospecific, aluminum dialkyl halides are preferred; aluminum diethyl chloride is most preferred. Instead of alkyl groups, suitable organometallic compounds may also have cycloalkyl, aryl, alkaryl or aralkyl groups.

In the production, according to this invention, of polyethylene or of polymers consisting predominantly of polyethylene, known, less stereoregulating catalysts may be employed, such as mixtures of titanium tetrachloride with the above-disclosed metal alkyl compounds, or organic vanadium compounds, such as esters, acetylacetonates, or the like.

Polymerizations in the individual reaction stages, and recovery of polymer, are suitably carried out according to methods known to be suitable for low-pressure olefin polymerization processes of the prior art.

The reaction temperature is generally maintained between 0° and 150° C. Particularly suitable temperature for the production of polyethylene are between 50° and 90° C. and for polypropylene between 40° and 70° C.

The reaction pressure is not critical. It is suitably between atmospheric pressure and 50 p.s.i.g., but it may be higher, e.g., up to 1000 p.s.i.

The polymerization time is one of the controlled variables, as explained above. It may vary from a few minutes to several hours.

In a suitable continuous operation, fresh feed, diluent and catalyst are continuously introduced into an agitated reaction zone, reaction mixture slurry is withdrawn to a second zone where additional feed is added, and reaction mixture is withdrawn from the second zone for removal and recovery of polymer. Heat or reaction may be withdrawn by indirect heat exchange or by evaporation of diluent and/or monomer in each reaction zone.

After the polymerization is complete, polymer is recovered from a slurry of the solid polymer in reaction diluent or from polymer solution. A simple filtration is adequate to separate solid polymer from diluent. Other means for separating polymer from diluent may be employed. The polymer may be treated, separately or while in the reaction mixture, in order to separate catalyst residues. Such treatment may be with alcohols such as methanol, ethanol, or isopropanol, with acidified alcohols, or with other similar polar liquids, or with several materials in sequence, such as alcohol followed by hydrogen chloride.

Catalysts are suitably used in a concentration ranging from about 0.1 to about 2% by weight based on the weight of the reaction mixture. The preferred molar ratios of organometallic reducing compound to transition metal halide or alkoxyhalide are in the range from 0.5:1 to 2:1, although higher ratios, e.g., up to 10:1, may be employed.

It is preferred to carry out the reaction according to this invention in a suitable diluent which is liquid under the conditions of reaction and relatively inert. The diluent may have the same number of carbon atoms per molecule as the olefin reactant or it may be in a different boiling range. Preferred as diluents are alkane and cycloalkane hydrocarbons. Suitable diluents are, for example, propane, butane, isobutane, cyclohexane, methylcyclohexane, tetralin, decalin, or saturated hydrocarbon mixtures in the gasoline boiling range or diesel oil boiling range. Aromatic hydrocarbons such as benzene, toluene, isopropylbenzene, xylene, or the like, or halogenated aromatic compounds such as chlorobenzene, or orthoodichlorobenzene and the like may be employed, if desired.

Although it is possible to use technical grades of olefins and diluents, containing the normal impurities present in such grades, it is much preferred to use purified olefin feed and purified diluents which are relatively free of impurities. Processes for purifying olefin reactants and diluents for low pressure polymerization processes are now well known to the art and are equally suitable for preparing feeds and diluents for use in processes of this invention.

It has been found convenient to assess the homogeneity of an olefin polymer by drawing it into thin films and assessing visually the extent to which inhomogeneity occurs. On this basis, polymers can be given a rating on any suitable scale and in the following example the ratings are expressed in terms of figures on the scale 1 (very good) to 6 (very poor).

The present invention is illustrated by the following examples, which are not to be considered as limiting the invention.

Example 1

Ethylene was polymerized with the aid of a Ziegler/Natta catalyst formed by mixing preformed gamma titanium trichloride with an equimolar amount of diethyl aluminum chloride, the actual catalyst concentration being 5 millimoles, per liter, of $AlEt_2Cl$ and of gamma $TiCl_3$. Polymerization was effected in a liquid reaction mixture comprising said catalyst and a non-olefinic aliphatic hydrocarbon distillate in the gasoline boiling range, and was carried out in two stages in reactors each having provision for efficient stirring of the reaction medium and for maintaining the latter at a temperature of 80° C. The reactors were also provided with means for transferring reaction medium from one reactor to the other and for providing for the controlled admission of ethylene to each reactor and of hydrogen to the first reactor. In each stage the production of the required amount of polyethylene having the required characteristics was assured by controlling the polymerization period (which determined the amount of polymer produced) and by adding hydrogen as a molecular weight modifier to the first reactor (which determined the intrinsic viscosity of the polymer produced therein). For simplicity the hydrogen/ethylene volume ratios are expressed in the following table (specifying the conditions employed and the results obtained) in terms of the ratio of the volume of hydrogen supplied to the reactor to the volume of ethylene supplied thereto. The resulting polymers were examined for homogeneity and rated as indicated in Table 1, which also includes for each polymer product figures for the melt index (MI) determined by the British Standard method and expressed in the usual terms of grams per 10 minutes and figures for the flow parameter determined in the manner described above.

TABLE 1

| Example | Stage | Gas Feed | | Polymerization Time (min.) | Product per stage | | Ultimate Polymer Product | | |
|---|---|---|---|---|---|---|---|---|---|
| | | Percent $C_2H_4$ | Percent $H_2$ | | I.V. | Percentage amount | M.I. | Flow Parameter | Rating |
| 1-1 | 1 | 55 | 45 | 165 | 1.55 | 79 | 0.57 | 1.80 | 2 |
|     | 2 | 100 | 0 | 15 | 4.3 | 21 | | | |
| 1-2 | 1 | 45 | 55 | 172 | 1.2 | 84 | 2.2 | 1.80 | 1 |
|     | 2 | 100 | 0 | 8 | 3.7 | 16 | | | |
| 1-3 | 1 | 55 | 45 | 158 | 1.55 | 72.5 | 0.27 | 1.94 | 1-2 |
|     | 2 | 100 | 0 | 22 | 5.0 | 27.5 | | | |
| 1-4 | 1 | 50 | 50 | 167 | 1.4 | 79 | 0.72 | 1.89 | 1 |
|     | 2 | 100 | 0 | 13 | 4.1 | 21 | | | |
| 1-5 | 1 | 45 | 55 | 162 | 1.2 | 69 | 0.35 | 1.99 | 1 |
|     | 2 | 100 | 0 | 18 | 4.6 | 31 | | | |
| 1-6 | 1 | 45 | 55 | 157 | 1.2 | 53 | 0.11 | 2.05 | 2 |
|     | 2 | 100 | 0 | 23 | 5.05 | 37 | | | |
| 1-7 | 1 | 50 | 50 | 159 | 1.4 | 68 | 0.24 | 2.03 | 2 |
|     | 2 | 100 | 0 | 21 | 4.9 | 32 | | | |

Example 2

By way of comparison two polyethylenes of flow parameter lying within the defined range 1.4 to 2.5 were produced by dry blending and slurry blending, respectively. In the case of the slurry blending the admixed slurry was subjected to conventional catalyst decomposition and polymer purification treatment to produce a dry polymer product. The dry-blended and slurry-blended polymers were each extruded to convert the polymers into nibs. These polyethylenes were then subjected to homogeneity assessment and in both cases a rating no better than 4 could be accorded. Since a rating as high as 4 is unacceptable for commercial usage it will be apparent that even the mixing of separately prepared suspensions of Ziegler polyethylenes in the form of the reaction media obtained from separate polymerizations under different conditions does not result in an acceptable homogeneity in the resulting polymer. In the case of dry-blending the results are no better and there is the additional factor of the cost involved in a dry-blending operation. The additional cost involved cannot be considered as a viable commercial operation on the large-scale in the present state of the Ziegler art. For example, it was found necessary to mill a mixture of two polyethylenes of melt index 2.6 and 0.005, respectively, at 160° C. for 5 minutes in the presence of 0.1 phr. (parts per hundred of resin) of calcium stearate and 0.02 phr. of Santonox R as antioxidant in order to achieve a polymer product having a flow parameter within the above-defined range. For example, blending the two polyethylenes in this way in the proportions 80:20 and 75:25, respectively, yielded polymer products of flow parameter 1.78 and 1.81, respectively. In each case, however, the homogeneity rating of the product by the above-described test was 4.

Example 3

Two polyethylenes were produced in accordance with the present invention by the method described in Example 1 except that polymerization was carried out in three stages, using three reactors arranged in series. In Example 3-1 hydrogen was supplied to all three reactors, while in 3-2 hydrogen was supplied only to the first and second reactors. Table 2 specifies the conditions employed and the results obtained.

by a 65 liter (working capacity) reactor of the kind used for Ziegler polymerization and generally similar to the 45 liter reactor except that no provision was made for recycling the gas phase, which was simply vented.

Polymerization was carried out by supplying the appropriate olefin monomer to the first reactor and effecting polymerization therein under controlled conditions for a period sufficient to form the required quantity of polymer of predetermined intrinsic viscosity in the first stage after which reaction medium comprising catalyst, formed polymer and petroleum distillate diluent was withdrawn from the first reactor and passed to the second reactor in which polymerization of the appropriate olefin monomer was effected under different controlled conditions for a period sufficient to form the required quantity of polymer of predetermined (different) intrinsic viscosity. In order to avoid too high a concentration of polymer in the second reactor, the polymer formed as a separate, solid phase under the polymerization conditions employed, additional petroleum distillate diluent was also supplied to the second reactor. This resulted in a lower concentration of gamma $TiCl_3$ in the second reactor, although the $AlEt_2Cl$

TABLE 2

| Example | Stage | Gas Feed | | Polymerization Time (min.) | Ultimate Polymer Product | | |
|---|---|---|---|---|---|---|---|
| | | percent $C_2H_4$ | percent $H_2$ | | M.I. | Flow Parameter | Rating |
| 3-1 | 1 | 35 | 65 | 150 | 2.9 | 1.76 | 1 |
| | 2 | 67.5 | 32.5 | 22 | | | |
| | 3 | 95 | 5 | 8 | | | |
| 3-2 | 1 | 25 | 75 | 150 | 0.44 | 2.04 | 1 |
| | 2 | 70 | 75 | 20 | | | |
| | 3 | 100 | 0 | 10 | | | |

Example 4

Further Ziegler polyethylenes were produced by the method described in Example 1, but under different catalyst concentration conditions as represented by the much lower concentration of gamma-$TiCl_3$ of 1 millimole per litre, the concentration of $AlEt_2Cl$ remaining at 5 millimoles per litre. The conditions employed and the results obtained, both expressed in the manner of Example 1, are indicated in Table 3. It will be seen that identical gas feed ratios were employed in the three examples and also that the polyethylene produced in the first stage had an I.V. of 1.7 in each case.

concentration therein was maintained at substantially the same level as in the first reactor by the supply of additional $AlEt_2Cl$ to the second reactor. As will be apparent to those in the art, the essential requirement of the present invention namely that the same catalyst particles having "active centers" at which polymerization takes place be present in both polymerization zones is met irrespective of the actual concentration of $TiCl_3$ per unit volume of reaction medium in the reactors.

When producing olefin polymer products from ethylene and minor amounts, e.g., up to 10% by weight (of the total olefin in the polymer product), of a co-monomer

TABLE 3

| Example | Stage | Gas Feed | | Polymerization Time (mins.) | Product per stage | | Ultimate Polymer Product | | |
|---|---|---|---|---|---|---|---|---|---|
| | | percent $C_2H_4$ | percent $H_2$ | | I.V. | Percentage amount | M.I. | Flow Parameter | Rating |
| 4-1 | 1 | 40 | 60 | 175 | 1.7 | 87 | 0.43 | 1.82 | 2 |
| | 2 | 100 | 0 | 5 | 4.2 | 13 | | | |
| 4-2 | 1 | 40 | 60 | 192 | 1.7 | 79 | 0.19 | 1.95 | 1-2 |
| | 2 | 100 | 0 | 8 | 4.8 | 21 | | | |
| 4-3 | 1 | 40 | 60 | 180 | 1.7 | 73 | 0.12 | 1.97 | 1-2 |
| | 2 | 100 | 0 | 12 | 5.5 | 27 | | | |

Example 5

This example illustrates the production in accordance with the present invention, of an olefin polymer product obtained using (1) ethylene and (2) ethylene and propylene as the respective olefin monomers supplied to the two stages of a polymerization carried out in two polymerization zones each operated under different polymerization conditions. The first stage was carried out in a polymerization zone formed by a 45 liter (working capacity) reactor of the kind used for Ziegler polymerization and having in addition means for recycling the gaseous phase, which would otherwise be vented, to the reaction medium comprising a dispersion of Ziegler catalyst comprising gamma $TiCl_3$ and $AlEt_2Cl$ in a petroleum distillate. During polymerization fresh olefin monomer was supplied to this reactor continuously in accordance with the polymerization rate therein so that the composition of the recycle gas was maintained constant. The second stage was carried out in a polymerization zone formed such as propylene or butene-1 in a two-stage system such as is exemplified in this example, the required products can be formed by supplying ethylene to both reactors and by supplying the co-monomer either to the first reactor or to the second reactor or to both reactors. In practice when using, e.g., propylene as the co-monomer the solubility of propylene in the reaction medium will result in a carry-over to the second reactor of propylene supplied to the first reactor unless steps are taken to remove propylene from the reaction medium between stages, which is inconvenient. In Examples 5-1 and 5-2, the co-monomer is deliberately added to the first reactor and to the second reactor, respectively, without inter-stage separation. These examples are typical of many polymerizations using ethylene and propylene in this way. Table 4 sets out the conditions employed in each reactor and the nature of the polymer (in terms of melt index and intrinsic viscosity) formed therein.

TABLE 4

| | Example 5-1 | Example 5-2 |
|---|---|---|
| Reactor 1: | | |
| Temperature, °C | 90 | 80 |
| Pressure, p.s.i.g. | 110 | 107 |
| AlEt$_2$Cl conc., mmole/l | 4.1 | 4.1 |
| TiCl$_3$ conc., mmole/l | 0.55 | 0.46 |
| C$_2$H$_4$ feed, grams/hr | 1,480 | 1,280 |
| C$_3$H$_6$ feed, grams/hr | | 250 |
| C$_2$H$_4$ in recycle gas, percent v | 29 | 32 |
| H$_2$ in recycle gas, percent v | 55 | 60 |
| C$_3$H$_6$ in recycle gas, percent v | | 6 |
| Recycle ratio (i.e., vol. recycle:vol. feed) | 10 | 12 |
| Residence time, hours | 3.6 | 3.5 |
| Melt index of first stage polymer, g./10 min | 4 | 4 |
| I.V. of first stage polymer | 1.6 | 1.6 |
| Reactor 2: | | |
| Temperature, °C | 80 | 78 |
| Pressure, p.s.i.g. | 80 | 80 |
| TiCl$_3$ conc., mmole/l | 0.36 | 0.31 |
| C$_2$H$_4$ feed, grams/hr | 1,000 | 550 |
| C$_3$H$_6$ feed, grams/hr | 45 | |
| H$_2$ feed, liters/hr | 40 | 10 |
| Residence time, hours | 3.4 | 3.4 |
| Melt index of second stage polymer, g./10 min | 0.0075 | 0.011 |
| I.V. of second stage polymer | 5.0 | 4.65 |
| Total Polymer Properties: | | |
| Melt index | 0.12 | 0.31 |
| I.V. | 3.0 | 2.55 |
| Flow parameter | 1.88 | 1.82 |

It will be apparent that in each case the higher molecular weight polymer, i.e., that having an intrinsic viscosity within the range 3 to 20 was produced in the second reactor. It has been found that in the case of polymerization in accordance with the present invention there are advantages from the point of view of the physical properties of the ultimate polymer product, in particular its stress cracking resistance characteristics, in effecting polymerization under conditions in which a co-monomer such as propylene is introduced into only the higher molecular weight polymer component as exemplified by the Example 5–2. For example, stress cracking characteristics, as determined by the Bell stress cracking test, for ethylene/propylene copolymer compositions made in this way in accordance with the present invention show a marked superiority to those of apparently similar compositions at present available, e.g., "Rigidex 5003".

I claim as my invention:

1. A polymerization process which comprises supplying ethylene to a first polymerization zone which contains a dispersion of a catalyst comprising catalytically active titanium trichloride and an aluminum alkyl compound in an inert liquid diluent and effecting polymerization of said ethylene therein under steady state conditions, continuously withdrawing from said zone a portion of the liquid reaction mixture formed in said zone which includes active catalyst, continuously supplying to a second polymerization zone said portion of reaction mixture withdrawn from said first zone, supplying ethylene to said second zone and effecting its polymerization in said second zone under steady state conditions different from the polymerization conditions maintained in said first zone, continuously withdrawing reaction mixture from said second zone and isolating therefrom the total polymer product of said process, the polymerization conditions in one of said zones being controlled, in dependence upon the rate of formation of polymer in the other of said zones and in dependence upon the intrinsic viscosity of polymer formed therein in such a manner that the intrinsic viscosity of polymer formed at the conditions prevailing in one of said zones is between 0.4 and 2.0 dl./g. and that of polymer formed at the conditions prevailing in the other zone is between 3 and 20 dl./g., and the flow parameter of said total polymer product is between 1.4 and 2.5.

2. A process according to claim 1 wherein polymerization is effected in the first of said zones under conditions at which there is former a polymer having an intrinsic viscosity between 0.4 and 2.0.

3. A process according to claim 1 wherein hydrogen is present during the formation of at least one of said olefin polymers comprised in the total polymer product.

4. A process according to claim 1 wherein the flow parameter of the total polymer product is within the range 1.7 to 2.2.

5. A process according to claim 1 wherein said catalyst consists essentially of titanium trichloride and an aluminum dialkyl halide.

References Cited

UNITED STATES PATENTS

| 2,868,762 | 1/1959 | Oakes | 260—897 |
| 3,127,370 | 3/1964 | Head | 260—897 |

FOREIGN PATENTS

| 601,560 | 2/1960 | Italy. |

SAMUEL H. BLECH, *Primary Examiner.*

D. J. BREZNER, M. J. TULLY, *Assistant Examiners.*